United States Patent
Mowat et al.

(10) Patent No.: US 7,249,219 B1
(45) Date of Patent: Jul. 24, 2007

(54) METHOD AND APPARATUS TO IMPROVE BUFFER CACHE HIT RATE

(75) Inventors: J Eric Mowat, Piedmont, CA (US); Yee-Peng Wang, Milpitas, CA (US); Carlos G. Maltzahn, Cupertino, CA (US); Raghu C. Mallena, San Jose, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 494 days.

(21) Appl. No.: 10/836,690

(22) Filed: Apr. 30, 2004

(51) Int. Cl.
*G06F 12/08* (2006.01)

(52) U.S. Cl. ..................... 711/113

(58) Field of Classification Search ............... 711/113, 711/118; 709/213
See application file for complete search history.

(56) References Cited

U.S. PATENT DOCUMENTS

| 6,542,967 | B1 * | 4/2003 | Major .................. 711/134 |
| 2006/0195660 | A1 * | 8/2006 | Sundarrajan et al. ....... 711/118 |

* cited by examiner

*Primary Examiner*—Kevin L. Ellis
(74) *Attorney, Agent, or Firm*—Blakely Sokoloff Taylor & Zafman LLP

(57) ABSTRACT

A network caching device includes primary storage and secondary storage. The network caching device creates a set of metafile entries, each of which contains metadata for a logical grouping of related objects cached by the network caching device, and uses the set of metafile entries to reduce accesses to the secondary storage in response to requests for the objects.

37 Claims, 10 Drawing Sheets

METHOD AND APPARATUS TO IMPROVE BUFFER CACHE HIT RATE

FIELD OF THE INVENTION

At least one embodiment of the present invention pertains to a method and apparatus to improve buffer cache hit rate, and more particularly, to a technique to improve buffer cache hit rate in a network caching device.

BACKGROUND

One use of the Internet is to allow users to access remotely stored content, such as documents and multimedia. To do so, typically a person operates a client device to access content on a remote origin server over the Internet. The client device may be, for example, a personal computer (PC) or a hand-held device such as a personal digital assistant (PDA) or cellular telephone. The client normally includes a software application known as a browser, which can provide this functionality. A person using the client typically operates the browser to locate and select content stored on the origin server, such as a web page or a multimedia file. In response to this user input, the browser sends a request for the content over the Internet to the origin server on which the content resides. In response, the origin server returns a response containing the requested content to the client, which outputs the content in the appropriate manner (e.g., it displays the web page or plays the audio file). The request and response may be communicated using well-known protocols, such as transmission control protocol/Internet protocol (TCP/IP) and hypertext transfer protocol (HTTP).

It is often desirable to cache network content in a device on the network that is located logically between the clients and the origin servers. The main purpose of caching content in this way is to reduce the latency associated with servicing content requests from clients. Storing certain content locally in the cache avoids the necessity of having to forward every content request over the network to the corresponding origin server and having to wait for a response. Instead, if the cache receives a request for content which it has cached, it simply provides the requested content to the requesting client (subject to any required authentication and/or authorization) without involving the origin server. An example of a device which has this functionality is the NetCache product designed and manufactured by Network Appliance, Inc. of Sunnyvale, Calif.

The information requested by a client from an origin server generally includes a number of objects. For example, if a client requests an HTML web page, that page is an object. The page may also include one or more images (e.g., .jpg, .gif, or .tiff), advertisements, and other entities, which are also objects. When a user of a client machine initiates an HTTP request for a web page, if the page includes other objects, the client device typically automatically issues an additional request for each of those objects. Although these additional requests are transparent to the user, this process takes time, which adds to the overall network latency perceived by the user. In a network cache it is desirable to reduce such latency.

Certain network cache implementations attempt to reduce latency by minimizing the number of disk input/output operations (I/Os) required per object by, for example, storing certain critical information about the objects in main memory. One implementation of a network cache maintain a hash table that stores references to all objects that it has cached. Objects are accessed using meta-information contained in inodes, which are stored in a separate file. For a particular cached web page, each hash table entry stores a reference to each object included in the web page as well as a reference to the web page itself. As long as the inode file is resident in memory, sufficient meta-information exists such that an object can be accessed using a single disk I/O. Once the object has been read into memory, subsequent requests for the same object can be served from memory.

In reality, however, such perfect conditions are rarely achieved. The inode file tends to be so large that it generally is not possible to retain it completely in memory (i.e., some of it must be stored on disk), and subsequent requests are rarely served from memory. Often the number of disk I/Os per object is greater than one.

Also, references to related objects (e.g., objects from a particular web page) tend to get spread out randomly throughout the hash table. Consequently, to deliver a single web page that includes multiple objects to a client, the network cache may have to perform multiple, essentially random disk I/Os. The result is less than optimal throughput in serving client requests.

SUMMARY OF THE INVENTION

The present invention includes a network device which includes primary storage and secondary storage and which performs a method that includes creating a set of metafile entries, each of the metafile entries containing metadata for a logical grouping of related objects stored by the network device, and using the set of metafile entries to reduce accesses to the secondary storage in response to requests for the objects.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
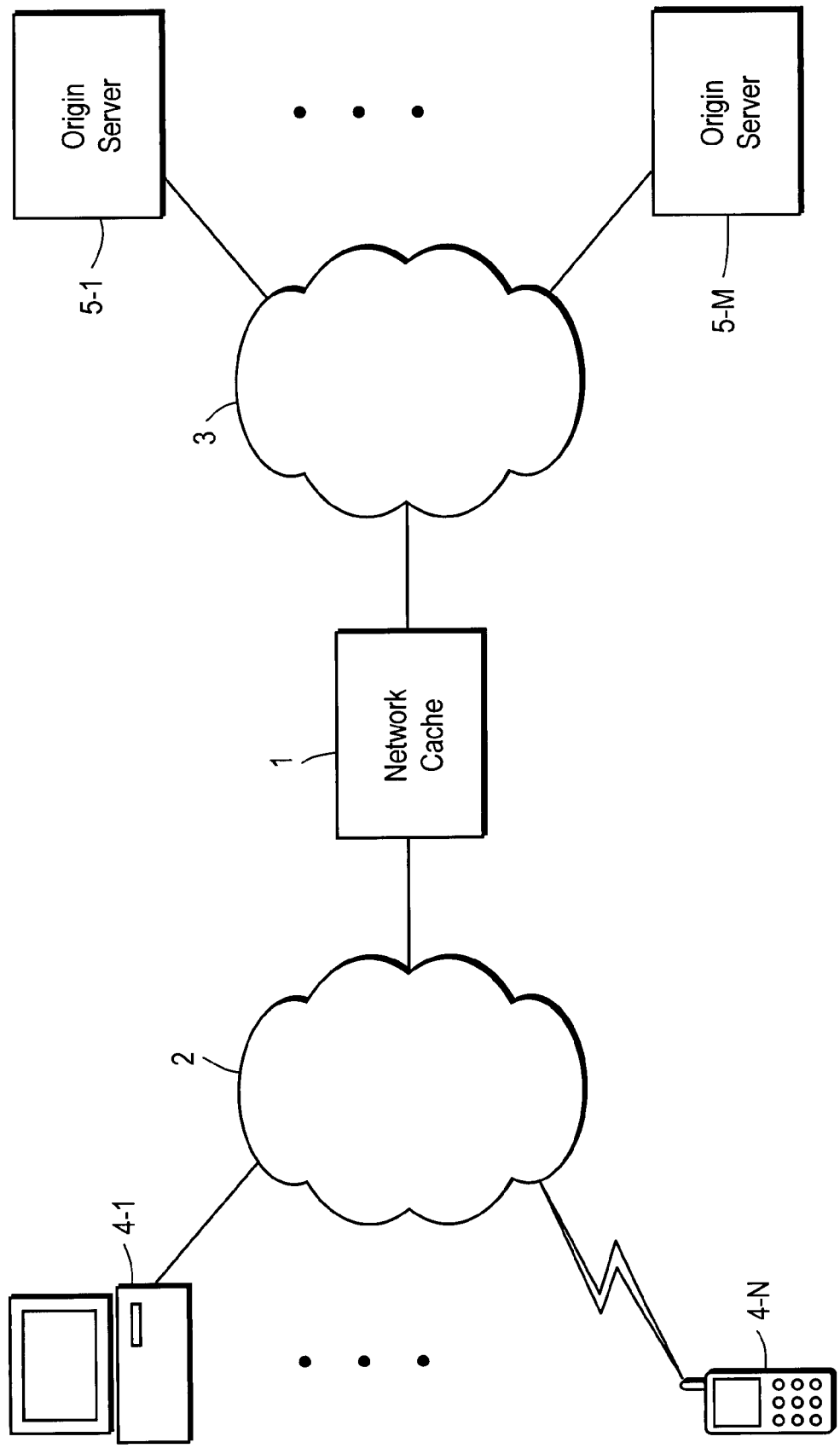
FIG. 1 illustrates a network environment that includes a network cache in accordance with the invention.

A method and apparatus for improving buffer cache (main memory) hit rate in a network caching device (a "network cache") are described. Note that in this description, references to "one embodiment" or "an embodiment" mean that the feature being referred to is included in at least one embodiment of the present invention. Further, separate references to "one embodiment" or "an embodiment" in this description do not necessarily refer to the same embodiment; however, such embodiments are also not mutually exclusive unless so stated, and except as will be readily apparent to those skilled in the art from the description. For example, a feature, structure, act, etc. described in one embodiment may also be included in other embodiments. Thus, the present invention can include a variety of combinations and/or integrations of the embodiments described herein.

It useful at this point to clarify certain terminology: The term "buffer cache" is used in this description to refer to the main memory (i.e., primary, non-persistent memory) of a network cache (which presumably includes additional, secondary memory, such as disks). Thus, increasing the buffer cache hit rate in this description does not refer to the likelihood that an object is cached by the network cache; rather, it refers to increasing the likelihood that a requested object will be resident in the main memory of the network cache at the time of the request, as opposed to stored only on disk in the network cache.

The technique introduced herein has two main aspects: 1) use of a separate metafile to add an additional layer of indirection between the hash table and the cached objects, and 2) intelligent packing of cached objects. Regarding the first aspect, it is observed that grouping into a single file as much data that can be obtained by a single disk I/O will help to increase in the buffer cache hit rate. Therefore, the metafile scheme introduced herein allows an arbitrary number of objects to be packed into a single file without overloading the fields in the file system inode (an "inode", as used in the following description, is essentially the same as an inode as used in a Unix operating system). This is accomplished, in part, by adding a layer of indirection. An inode now can reference a collection of cached objects, while a metafile entry describes the placement and location of the objects contained in the file referenced by the inode. The metafile is referred to herein as the "mnode file". An entry in the mnode file is referred to herein as an "mnode". An mnode thus can contain meta-information for multiple related objects. The overall size of meta-information required to access an object is reduced, since a single inode now can reference multiple objects Proper object packing is the second aspect of improving the buffer cache hit rate. Once the inode and mnode regions of the file have been read, proper object packing will result in these regions being read again as the additional objects within the file are retrieved. The intelligent packing scheme described below increases the likelihood that related web objects are grouped together in the file system of the network cache. Optimal disk placement can be achieved by making effective use of a feature in the file system that optimally writes together all disk I/Os to a single file within the last (for example) 10 seconds. This approach significantly reduces the random nature of the file system reads while placing the responsibility of optimal disk layout with the file system. When a single object is read, the entire file can be efficiently read using a single I/O. This leaves the other objects already in memory when the next object is requested.

This technique improves the performance of a caching device by: 1) reducing the size of meta-information needed to access a single object (this is important because it means that main memory is being used more efficiently, which improves overall performance); and 2) improving the likelihood that objects will already be resident in main memory by the time they are requested (achieved using efficient packing schemes and disk read-ahead algorithms). This technique can be useful for other caching problems as well. This technique is general enough to support other protocols where locality of reference is required for improved performance. This technique may also be useful in low bit-rate streaming where grouping multiple small streaming files would reduce the disk utilization and improve the buffer cache hit rate.

Refer now to FIG. 1, which illustrates a network environment which includes a network cache according to the invention. The network cache 1 is connected between a first interconnect 2 and a second interconnect 3. A number (N) of clients 4-1 through 4-N (collectively, "clients 4") are coupled to the first interconnect 2, and a number (M) of origin servers 5-1 through 5-M (collectively, "origin servers 5") are coupled to the second interconnect 3. The network cache 1 caches certain content which resides on the origin servers 5, for purposes of providing such content to clients 4. Interconnects 2 and 3 may be the same interconnect or different interconnects, or they may overlap. Either or both of interconnects 2 and 3 may be or may include, for example, the Internet, a local area network (LAN), a wide area network (WAN), a wireless telecommunications network, a personal area network (PAN), or a combination of such networks.

When the network cache 1 receives a request from a client 4 for an object which resides on an origin server 5 but is not cached in the network cache 1, the network cache 1 forwards the request to the appropriate origin server 5 and returns the response of the origin server 5 (which may include the requested object) to the requesting client 4. If the requested object is cached, the network cache 1 simply provides the object to the requesting client 4 (subject to any necessary authorization, authentication, content validity/freshness checks, etc.), without forwarding the request to the origin server 5.

Note that the techniques introduced herein can be used advantageously in environments other than that shown in FIG. 1. For example, the techniques introduced herein can be applied to essentially any device which performs caching, not necessarily a network cache.

Figure 2:
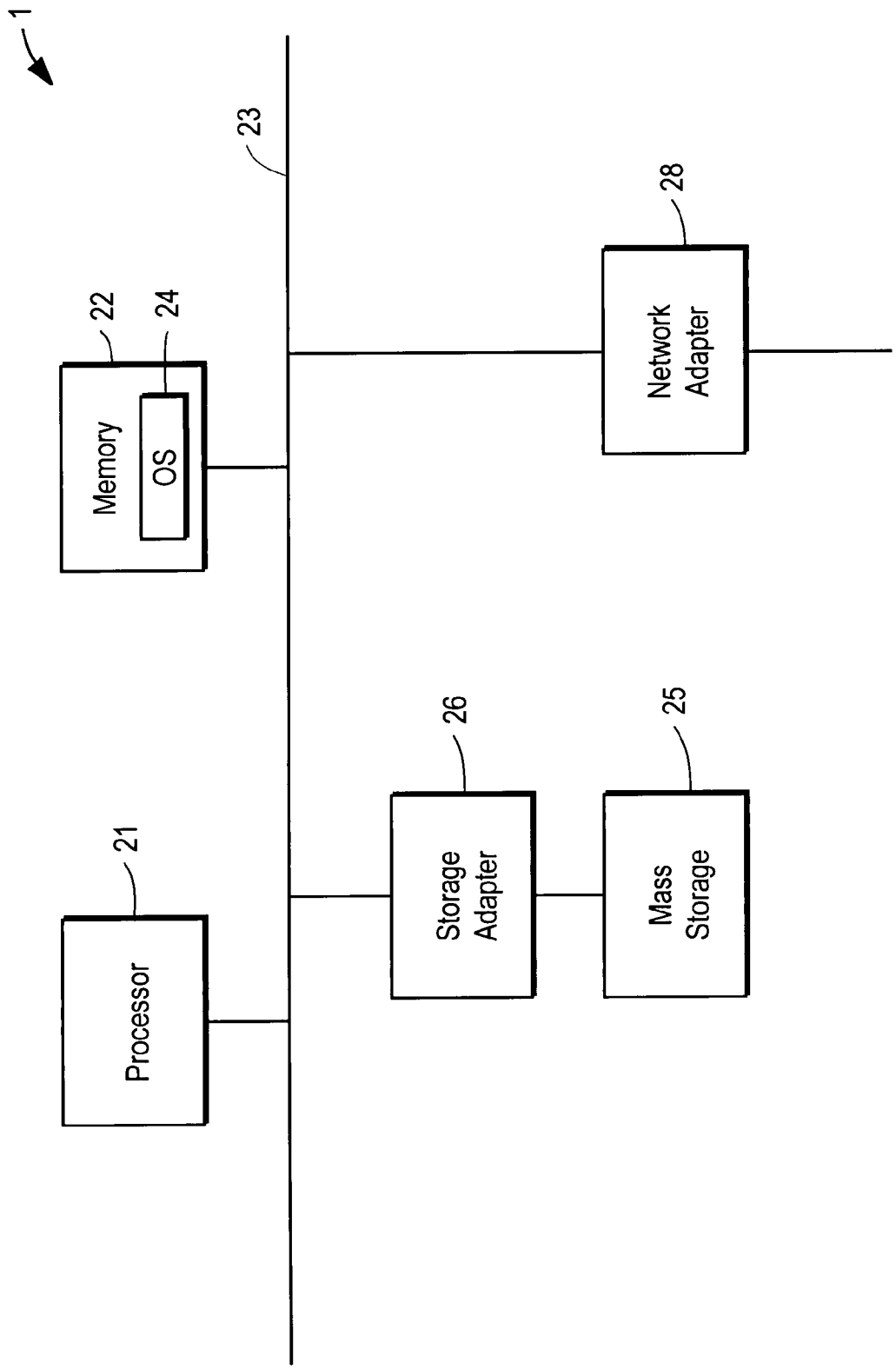
FIG. 2 is a block diagram of the network cache according to an embodiment of the invention.

FIG. 2 shows the architecture of the network cache 1, according to certain embodiments of the invention. Note that certain standard and well-known components which are not germane to the present invention are not shown. The network cache 1 includes one or more processors 21 and memory 22, coupled together by a bus system 23. The bus system 23 in FIG. 2 is an abstraction that represents any one or more separate physical buses and/or point-to-point connections, connected by appropriate bridges, adapters and/or controllers. The bus system 23, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processor 21 is the central processing unit (CPU) of the network cache 1 and, thus, controls the overall operation of the network cache 1. In certain embodiments, the processor 21 accomplishes this by executing software stored in main memory 22. The processor 21 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 22 includes some form of random access memory (RAM), read-only memory (ROM) (which may be programmable), or both. Memory 22 includes the main memory (buffer cache) of the network cache 1. Memory 22 also stores the operating system 24 of the network cache 1, which is described below. Note that memory 22 may be implemented by multiple physical memory devices. The technique introduced herein may be implemented at least partially within the operating system 24, as described further below.

Also connected to the processor 21 through the bus system 23 are a network adapter 28 and one or more mass storage devices 25. The network adapter 28 provides the network cache 1 with the ability to communicate over a network with remote devices, such as the clients 4 and origin servers 5, and may be, for example, an Ethernet adapter. The mass storage devices 25 are the "secondary" storage of the network cache 1 and may be essentially any devices suitable for persistently storing large volumes of data, such as magnetic or optical disks. Henceforth, to facilitate description, the mass storage devices 25 are assumed to be disks. The mass storage devices 25 may include one or more internal mass storage devices (i.e., installed within the same box as the other components of the network cache 1) and/or one or more external mass storage devices. The mass storage devices 25 are connected to the bus system 23 through a storage adapter 26, which may be, for example, a Fibre Channel or SCSI adapter.

Figure 3:
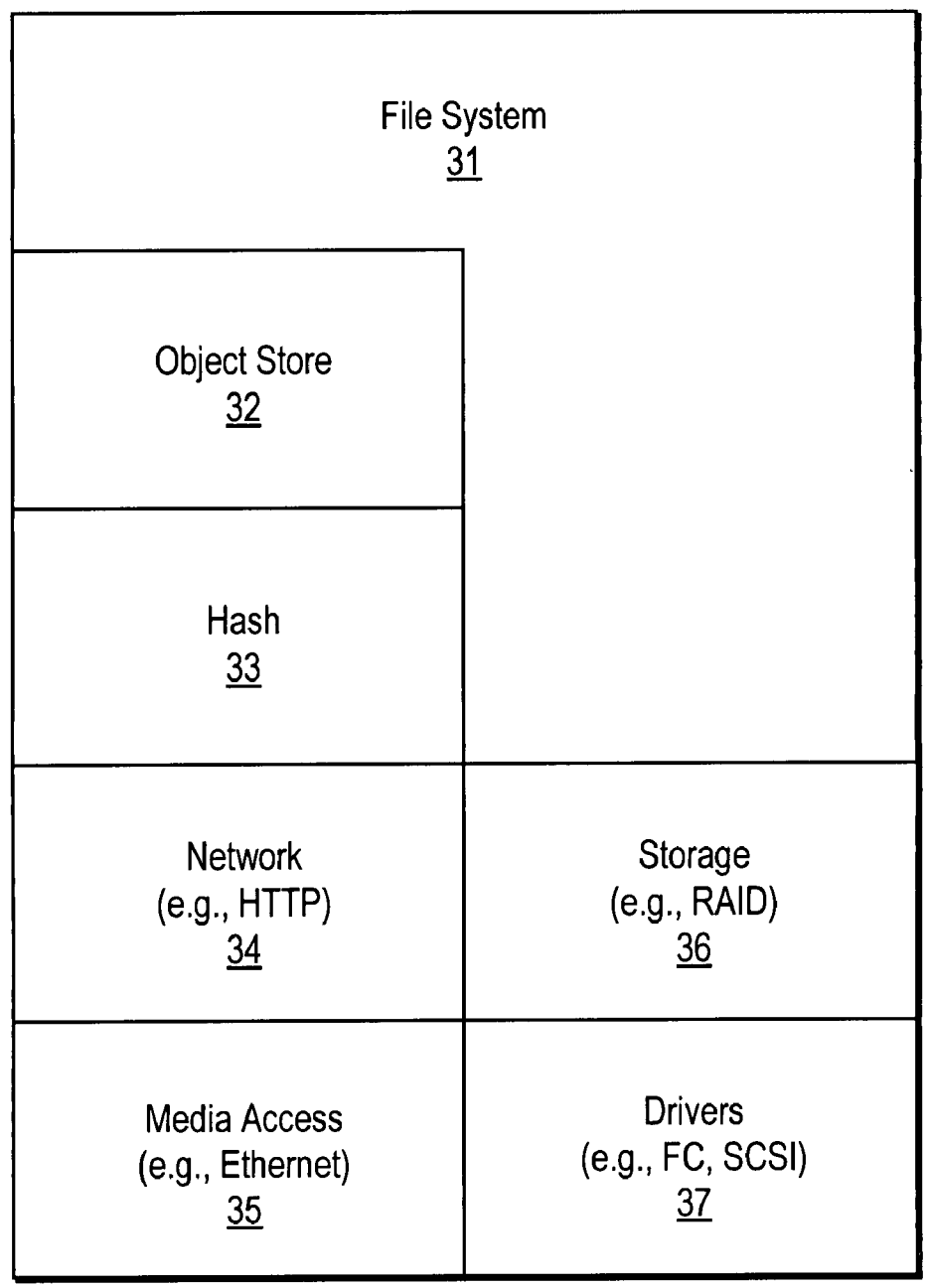
FIG. 3 is a block diagram of the operating system of the network cache according to an embodiment of the invention.

FIG. 3 illustrates the operating system 24 of the network cache 1, according to certain embodiments of the invention. As can be seen, the operating system 24 includes a number of layers. At the highest logical level is the file system layer 31 which, among other responsibilities, maintains the file system, executes read and write operations on main memory and disks in response to client requests, etc.

Below the file system layer 31 on the storage side, the operating system 24 includes a storage access layer 36 and, at the lowest level, a driver layer 37. The storage access layer 36 implements a redundant mass storage protocol such as RAID, while the driver layer 37 implements a lower-level storage device access protocol, such as Fibre Channel or SCSI.

Below the file system layer 31, on the network side the operating system 24 includes an object store 32, a hash layer 33, a network layer 34 and, at the lowest level, a media access layer 35. The main purpose of the object store 32 is to efficiently store and retrieve objects from the file system. In addition, the object store 32 implements the algorithms which keep track of all mnodes and mobjects used in the network cache 1. The hash layer 33 includes the hash tables and functions that are described above and further described below. The network access layer 34 implements the protocols used to communicate with clients and origin servers 5 over a network, such as HTTP and TCP/IP. The media access layer 35 includes one or more drivers which implement the protocol(s) used to communicate over the network, such as Ethernet.

Figure 4:
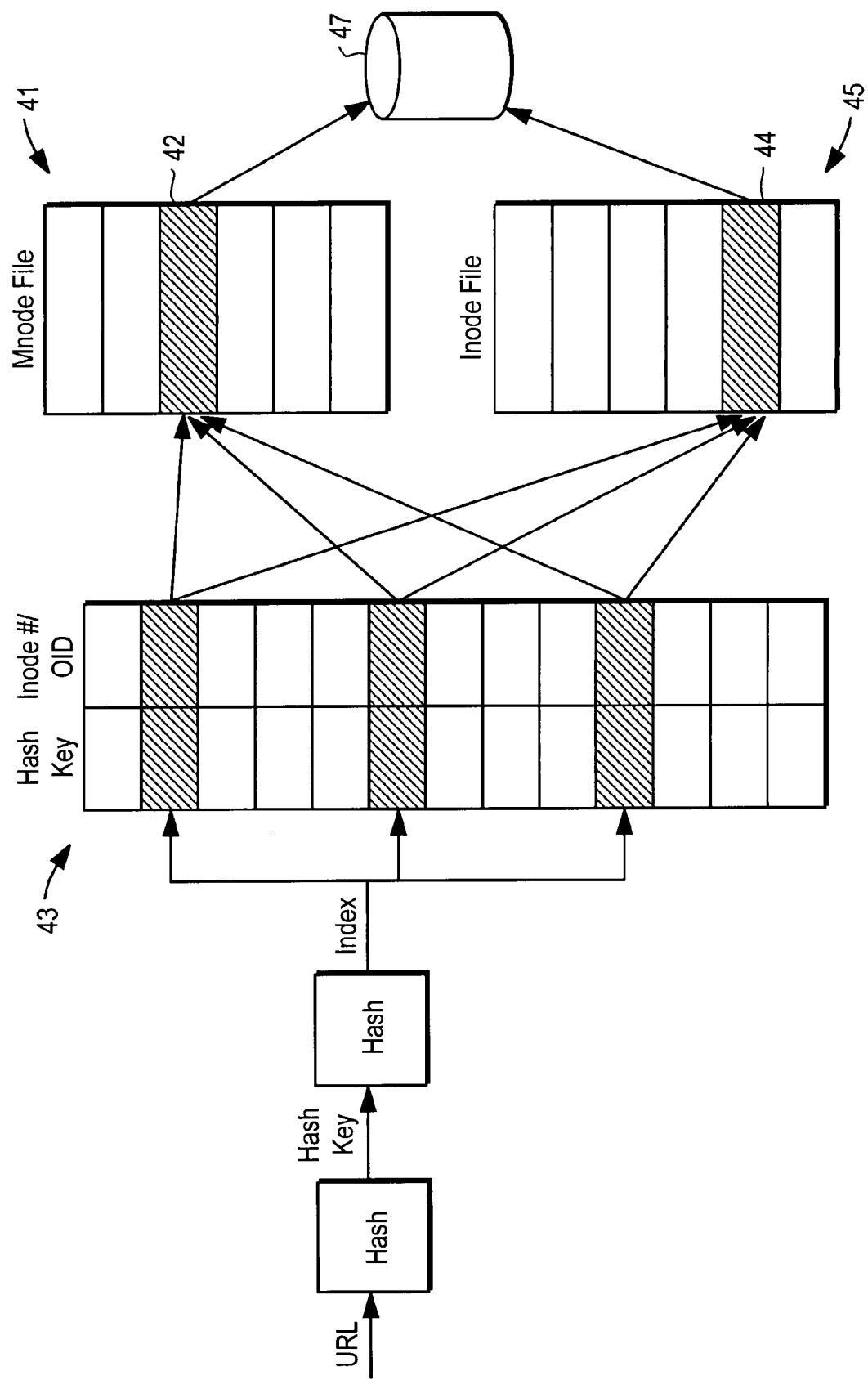
FIG. 4 shows how a hash table is used to locate an mnode in the mnode file and an inode in the inode file according to an embodiment of the invention.

Referring now to FIG. 4, as mentioned above the technique introduced herein includes creating a separate metafile ("mnode file") 41 which contains metadata on cached files.

Figure 5:
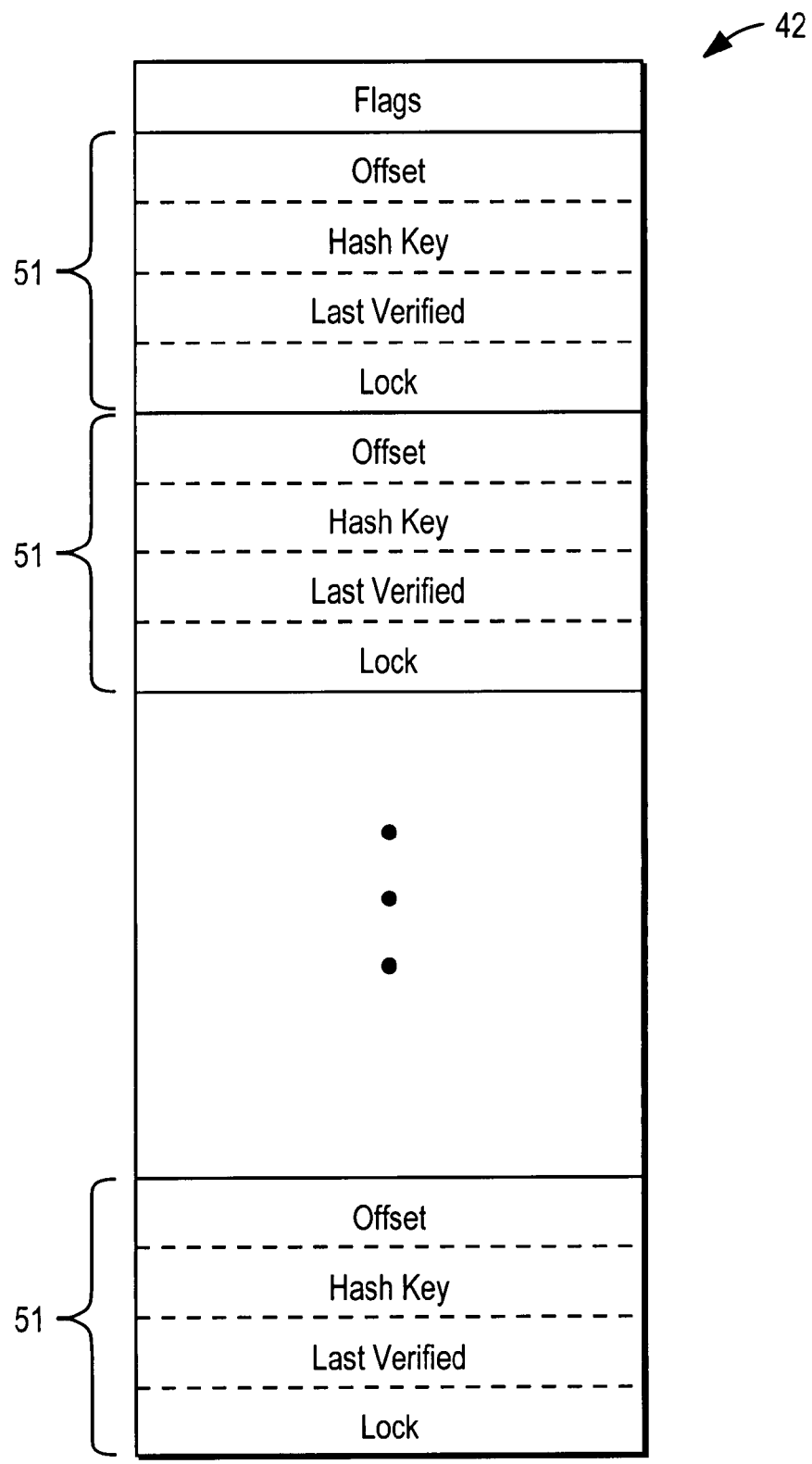
FIG. 5 illustrates an example of the logical form of an mnode according to an embodiment of the invention.

The mnode file 41 is updated as objects within the cached file are updated and written to disk. A single entry in the mnode file, i.e., an mnode 42, can describe multiple objects within a cached file (or "container file") 47. To do this, as shown in FIG. 5, each mnode 42 includes an array of object descriptors 51, each containing metadata for a different object (note that FIG. 5 is a logical representation; the actual physical storage format of an mnode 42 is not important for purposes of understanding the invention). Each object descriptor 51 in an mnode is referred to herein as a "mobject". In certain embodiments, as shown in FIG. 5, each mobject 51 includes the following metadata: the hash key (e.g., MD5 key) of the object, the offset of the object within the file 47, the time at which the object's freshness was last checked with the server ("last verified" time), and a lock indicator to indicate when an object locked in the cache can be removed. An mnode 42 also contains one or more flags, such as a flag to indicate whether the mnode 42 contains valid data. Such a flag is cleared when content is removed from the secondary storage (mass storage) of the network cache 1. On reboot, entries without the flag set are ignored.

It is possible for each mnode 42 to have a variable size and thus reference an arbitrary number of objects in each cached file 47. However, experimentation has demonstrated that such variability is unnecessary. The vast majority of all accesses in a standard benchmark require no more than eight objects per file. Thus, in order to simplify the implementation, the number of mobjects 51 in each mnode 42 is fixed at eight in certain embodiments of the invention. This allows the mnode 42 to be accessed as an array and provides a simple, logical mapping between inode and mnode numbers.

Referring again to FIG. 4, the hash table 43 contains references to all objects currently cached by the network cache 1, either in main memory ("buffer cache") or on disk. Each reference to an object is associated in the hash table 43 with a hash key (e.g., an MD5 key). In response to a request from a client 4, the URL of the requested object is hashed to generate the hash key of the requested object and the associated index into the hash table 43. The hash table 43 allows the system to quickly determine whether or not a requested object is cached. If the object is cached, then the hash table 43 provides the hash key of the object and a reference to an inode 44 in the inode file 45, i.e. the inode number of the file 47 containing the object. The highest order bit of the inode number in the hash table 43 is used to indicate that the cached file 47 is a special file containing multiple objects. The inode number is also the index into the mnode file 41 and is, therefore, also referred to as the object identifier (OID).

Note that related objects may have different URLs and therefore may be represented by different hash keys in the hash table 43; however, they will refer to the same mnode and inode if they are packed into the same cached file 47 (object packing is described further below).

Reading a cached object requires the corresponding mnode 42 to be read and then the cached data file 47 to be read at the desired offset. Efficient file system read-ahead capabilities ensure that the entire file 47 is brought into memory while the first request is being serviced. Assuming that the other objects within the file 47 will be accessed next, the mnode 42, inode 44 and data file will be complexly resident in memory, and no disk I/Os will be needed to serve these objects.

As indicated above, packing multiple objects into a file intelligently is important in restoring some locality of reference to otherwise random file system I/O. In certain embodiments of the invention, this is accomplished generally as follows. When a request for an object is received from a client, the identity of the originating client is determined by looking at certain headers (e.g., the "X-Forwarded-For" header) or the Internet Protocol (IP) address of the incoming socket. Objects requested by the same client within a predetermined period of time (e.g., six seconds) are deemed to be related for purposes of object packing and are therefore packed into one file, when practical. The idea is that a browser will make multiple, nearly simultaneous requests for objects on an HTML page. These objects are not necessarily all stored by the same server, so merely using the URL of each object to determine relatedness may not yield an optimal packing scheme. Instead, these client accesses are used to determine the temporal locality of the objects. If multiple objects have been accessed in this pattern previously, then it is likely that they will be accessed in the same way again.

This algorithm can be implemented by allocating a file 47 (FIG. 4) to store the data in the network cache 1. As objects are written to the file 47, a main memory copy of the mnode is maintained and associated with the particular client retrieving the data. After the mnode has reached a defined maximum size, either by hitting the maximum number of objects (e.g., eight, for HTTP objects) or the maximum data size (e.g., 64 KBytes), the mnode is written to disk. In order to avoid fragmentation of the data file, an mnode may not be left in this pending state longer than it takes the file system to flush its data to disk (e.g., six seconds). If an mnode has been left pending in memory longer than this idle time, it is also written to disk. This also avoids packing unrelated objects together, which would adversely impact buffer cache performance.

Figure 6:
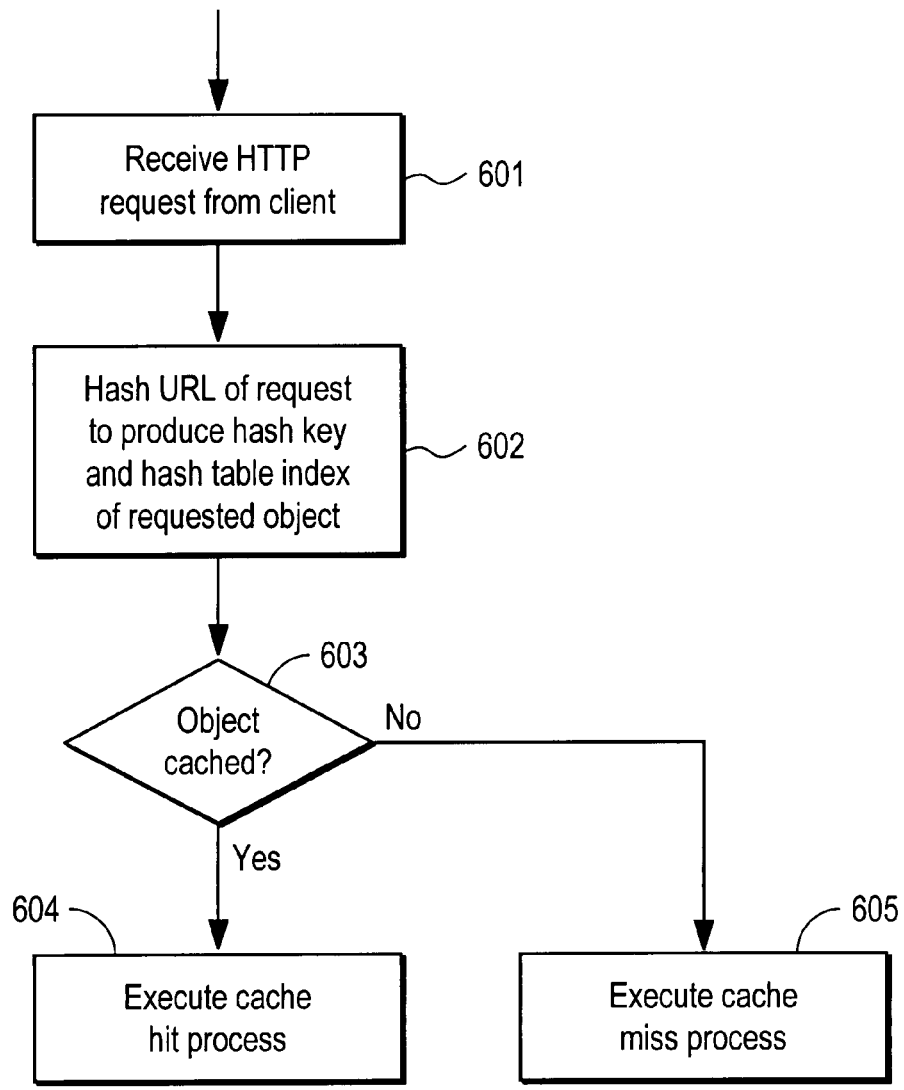
FIG. 6 is a flow diagram illustrating a process, in the network cache, of responding to a request from a client according to an embodiment of the invention.

Refer now to FIG. 6, which shows the overall process performed by the network cache for processing an HTTP request from a client. Initially, an HTTP request is received from a client (601). Next, the URL of the request is hashed to produce the hash key and hash table index of the requested object (602). It is then determined whether the object is cached (603), by determining whether the hash index is represented in the hash table 43 (see FIG. 4). If the object is cached (i.e., the hash index points to an entry in the hash table 43), then the network cache 1 executes the cache hit process of FIG. 7. If the object is not cached (i.e., the hash index does not point to an entry in the hash table 43), then the network cache 1 executes the cache miss process of FIG. 8.

Figure 7:
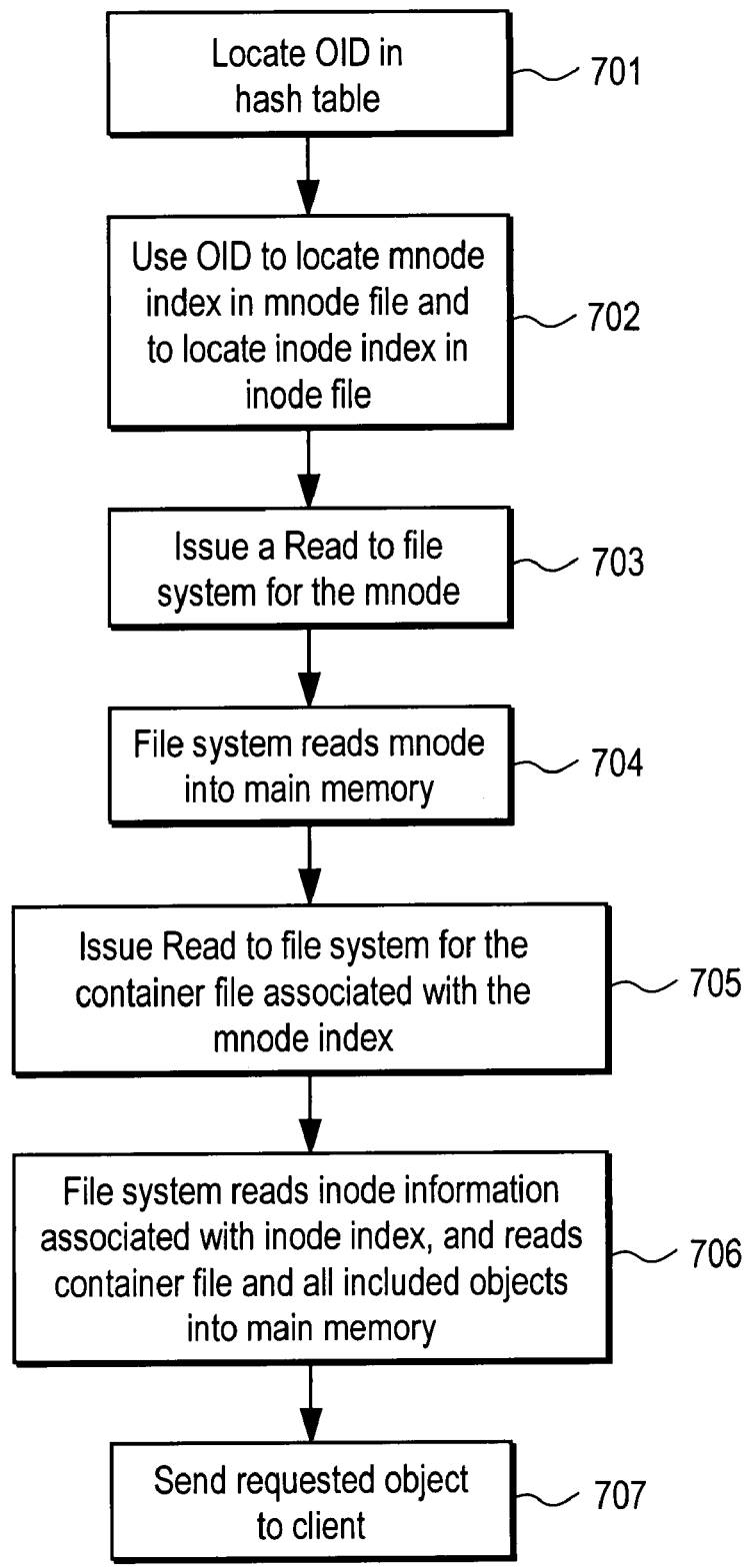
FIG. 7 is a flow diagram illustrating a process, in the network cache, of handling a cache hit, according to an embodiment of the invention.

Referring now to FIG. 7, the cache hit process will now be described, according to an embodiment of the invention. Initially, the OID of the requested object is located in the hash table 43 (701). This is accomplished by hashing the URL to get the hash key, and then using the hash key to look up the corresponding OID in the hash table 43. The OID is then used to locate the index of a corresponding mnode 42 in the mnode file 41 and the index of a corresponding inode 44 in the inode file 45 (702). A Read operation is then issued to the file system 31 (see FIG. 3) for the mnode (703). The file system 31 then reads the correct mnode 42 into main memory (704). Next, a Read operation is issued to the file system 31 for the container file 47 associated with the inode index (705). The file system 31 then reads the inode information associated with the inode index and reads the container file 47 and all objects included in it into main memory (706), by using the metadata (e.g., the offset) in the mobjects 51 in the mnode 42 to locate and read the objects. Finally, the network cache 1 sends the requested object to the requesting client (707).

As mentioned above, intelligent object packing, as described herein, increases the likelihood that related web objects are grouped together in the file system of the network cache. Thus, when a single object is read, the entire file is efficiently read using a single I/O. Consequently, when the next related object is requested, that object and any other related objects are already in main memory. Thus, referring to the process of FIG. 7, if a subsequent request is received for a second, related object, that object should already be in main memory as a result of the request for the first object, such that there is no need to retrieve the second object from mass storage.

Figure 8A:
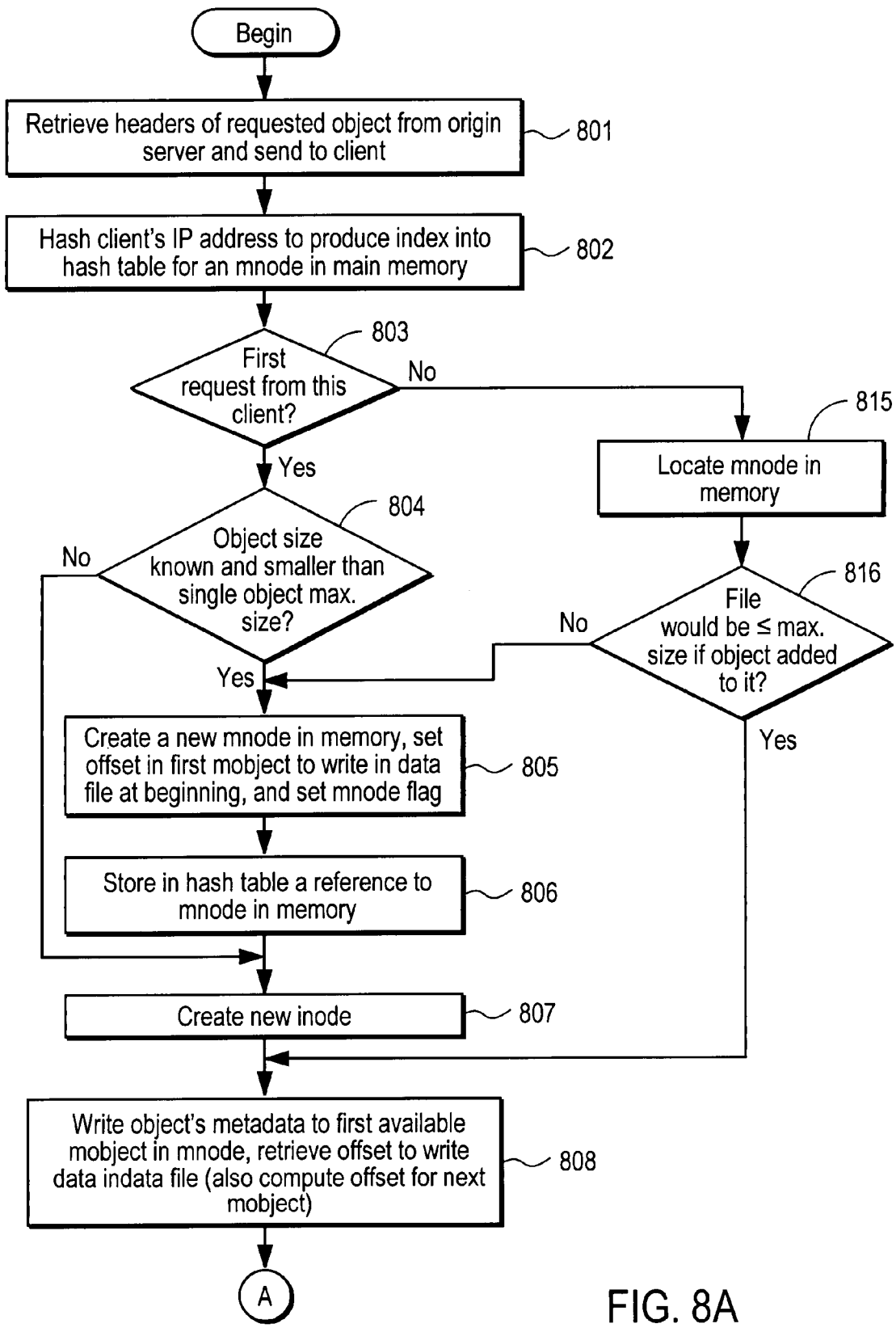
FIGS. 8A and 8B are a flow diagram illustrating a process, in the network cache, of handling a cache miss, according to an embodiment of the invention.
Figure 8B:
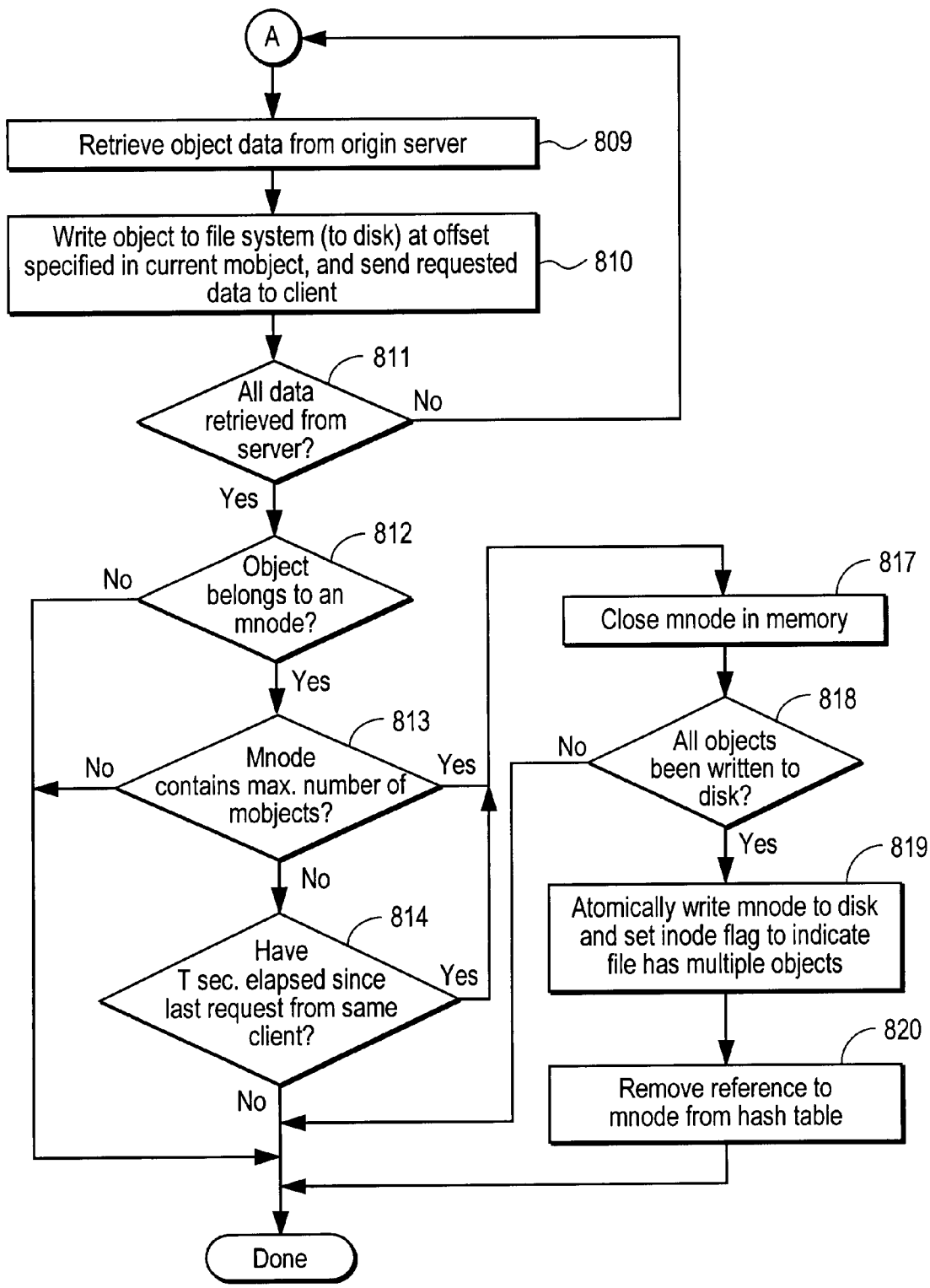
Figure 9:
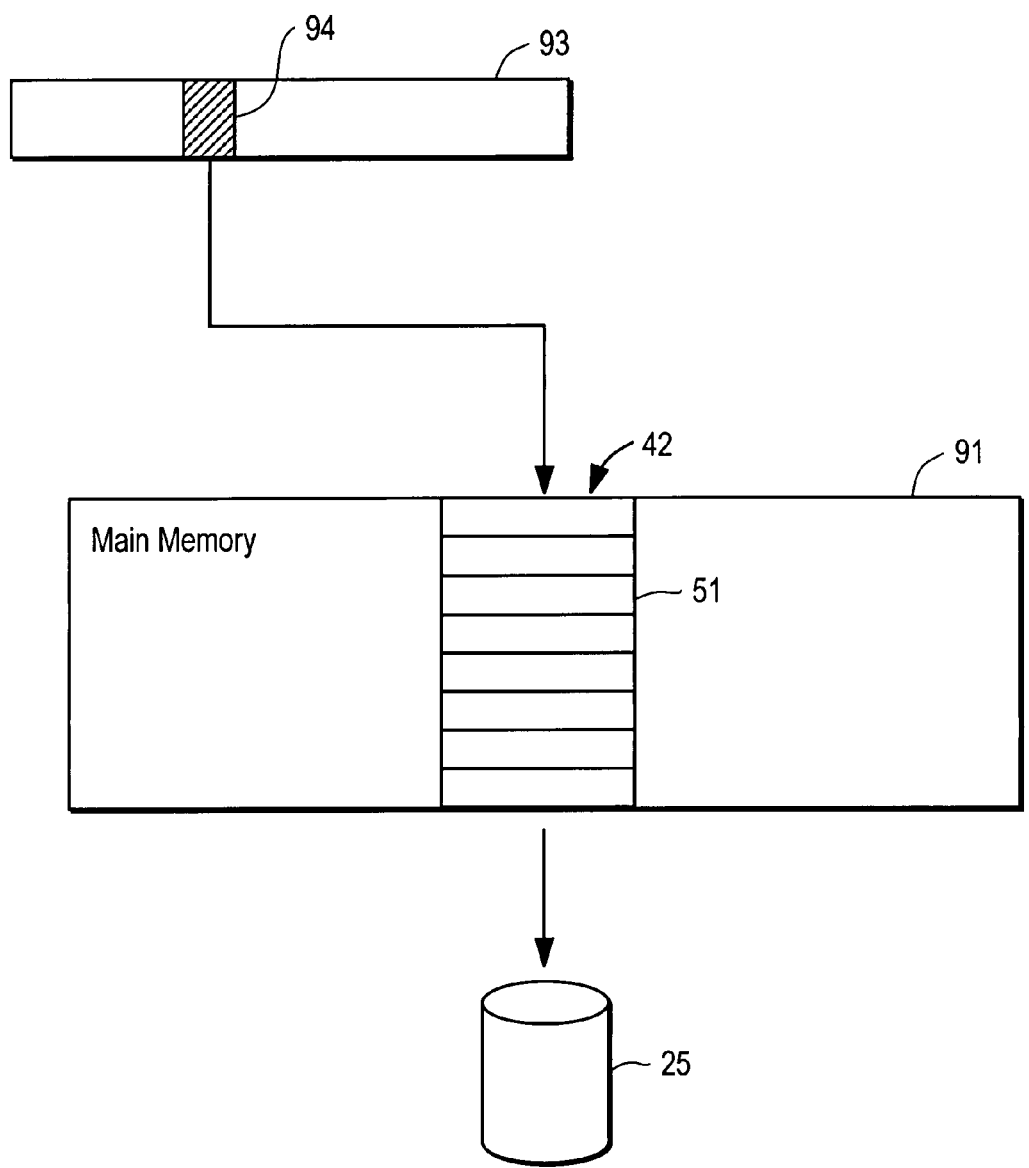
FIG. 9 shows a hash table used to reference an mnode in main memory prior to saving the mnode to disk.

Referring now to FIGS. 8A and 8B, the cache miss process will now be described, according to an embodiment of the invention. Initially, the network cache 1 retrieves the headers of the requested object from the origin server and sends them to the requesting client (801). As shown in FIG. 9, main memory 91 can contain one or more mnodes 42. When an mnode 42 in main memory 91 becomes full (i.e., it reaches maximum size or contains maximum number of mobjects), it is closed and saved to disks 25. A hash table 93 (separate from hash table 43 described above) is used to store references 94 to open mnodes 42 in main memory 91, which are indexed by hashing the requesting client's IP addresses.

Therefore, referring again to FIG. 8, after the requested object's headers are sent to the requesting client (801), the client's IP address is hashed to produce an index into the hash table 93, to obtain a reference to an mnode 42 in main memory 91 (802). If the request was the first request from this client (803), the process proceeds by determining whether the size of the requested object is known and is smaller than a predefined maximum size for a single object (804) (the size of the requested object can be determined from its headers). If the object exceeds the maximum size, then the process continues from 807 (creating a new inode), as described below. If the object is smaller than the maximum size, then (at 805) a new mnode 42 is created in main memory 91, the offset specified in the first mobject 51 (see FIG. 5) of that mnode 42 is set so as to write the object to the beginning of the data file 47, and the mnode flag in the object's OID (i.e., the highest order bit of the OID) is set. Next, a reference 94 to the mnode 42 is stored in hash table 93 (806). At 807, a new inode is created for the object.

Referring back to 803, if the request was not the first request from this client, then the hashing of the client IP address is used to locate an mnode 42 which already resides in main memory 91 (815). Then, if it is determined (816) that the size of the cached file 47 would not exceed the maximum file size if the requested object is added to it, the process continues from 808, as described below. Otherwise, the process continues from 805, as described above.

In 808 the object's metadata are written to the first available mobject 51 in the mnode 42. In addition, the previously set offset for this object is retrieved from the mobject 42 to write the object data in the data file 47. Also, the offset for the next mobject to be potentially used (i.e., for a subsequent related object, if any) is also computed. Object data is then retrieved from the origin server (809). The object data is then written to the file system 31 (and therefore written to disks 25) at the offset specified in the current mobject 51, and the retrieved data is also sent to the client (810). If there is more data to be retrieved for the requested object (811), the process loops back to 809; otherwise the process continues from 812.

Following 811, the process ends if any of three conditions occurs: 1) the object does not belong to an mnode (i.e., the mnode flag is not set) (812); 2) the mnode contains the maximum number of (e.g., eight) mobjects (813); or 3) at least a predetermined number, T, of seconds (e.g., six seconds) have elapsed since the last request from the same client (client identity can be determined from the request headers) (814). If the object belongs to an mnode (812) but that mnode 42 (in memory 91) contains the maximum number of mobjects (813), then the mnode 42 is closed and written from main memory 91 to disks 25 (817). Likewise, if the object belongs to an mnode 42 (812) in memory 91, which does not contain the maximum number of mobjects (813), but more than T seconds have elapsed since the last request from this client, then the mnode 42 is closed in main memory (817).

After closing the mnode (817), if all objects have been written to disk (818) (i.e., the writes of all individual objects belonging to the data file have been completed), then the mnode 42 and the inode in main memory 91 are atomically written to disks 25 (819), and the reference 94 to this mnode 42 is removed from the hash table 93 (820), after which the process ends.

Note that prior to servicing client requests, it is necessary to properly configure the network cache 1 during system boot. During system boot, the objects cached in the network cache 1 must be processed and indexed in hash table 43 (FIG. 4). This is accomplished in two phases. Referring again to FIG. 4, the first phase involves scanning the inodes 44 in the inode file 45. This is more efficient than reading the information from the data file 47, since inode file reads return information about many cached objects. When an inode 44 referring to a multiple object file 47 is encountered (indicated by the highest order bit in the inode number), it is temporarily skipped. The second phase of the boot process then proceeds to scan the mnode file 41 to build up the hash table 43. This is also an efficient operation, since a single I/O to the mnode file 41 can return information about multiple objects.

A consequence of relying only on the mnode at boot, however, is that updates to the mnode file 41 and inode file 45 on disk must be atomic (i.e., synchronous). When the cache replacement algorithms determine that an older object should be replaced, both the inode and mobject information must be cleared. Failure to ensure atomic semantics can result in incorrect objects being reconstructed in the event of a system failure. Therefore, the file system should provide an interface to achieve these transactional semantics, such as by using appropriate calls to the file system layer 31.

Thus, a method and apparatus for improving buffer cache hit rate in a network caching device have been described. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
creating a set of metafile entries in a network device which includes primary storage and secondary storage, each of the metafile entries containing metadata for a logical grouping of related objects stored by the network device; and
using the set of metafile entries to reduce accesses to the secondary storage in response to requests for the objects, including
receiving a request for an object from a client over a network;
determining whether the object is cached by the network device; and
if the object is not cached by the network device, then in response to the request for the object,
determining whether the object is related to a previously requested object, wherein the object is determined to be related to the previously requested object if the object and the previously requested object are determined to have been requested by the same client within a specified period of time, and
if the object is determined to be related to the previously requested object and a predetermined condition is met, then
writing the object to a file in the secondary storage, and
writing metadata for the object into a metafile entry which contains metadata for both the object and the previously requested object.

2. A method as recited in claim 1, wherein the network device is a network caching device which caches objects provided by origin servers in response to requests from clients on a network.

3. A method as recited in claim 1, wherein the primary storage is a main memory of the network caching device and the secondary storage is a mass storage facility of the network caching device.

4. A method as recited in claim 1, further comprising providing a requested object to a requesting device over a network in response to receiving a request for the object.

5. A method as recited in claim 1, wherein using the set of metafile entries to reduce accesses to the secondary storage comprises:
if the object is cached by the network device, then in response to the request for the object,
identifying a metafile entry as being associated with the object, and
using metadata in the metafile entry to locate and read each of a plurality of related objects from the secondary storage into the primary storage.

6. A method as recited in claim 5, further comprising:
receiving a request for one of the related objects from a client over the network; and
accessing said one of the related objects in the primary storage to provide said one of the related objects to the client, without accessing the secondary storage in response to the request for said one of the related objects.

7. A method as recited in claim 1, wherein the file also contains the previously requested object.

8. A method as recited in claim 1, wherein the predetermined condition comprises a size limit imposed on the metafile entry.

9. A method as recited in claim 1, wherein the predetermined condition comprises a size limit imposed on the file in the secondary storage.

10. A method of operating a network caching device which includes a main memory and a secondary storage facility, the method comprising:
receiving a request for a first object from a client over a network;
determining whether the first object is cached by the network caching device;
if the first object is cached by the network caching device, then in response to the first request,
identifying a first metafile entry as being associated with the first object, the first metafile entry containing metadata for a plurality of related objects, including the first object, stored in a single file in the secondary storage facility,
using the metadata in the first metafile entry to locate and read the plurality of related objects, including the first object, from the secondary storage facility into the main memory, and
providing the first object to the client;
receiving a request for a second object from a client over the network;
determining whether the second object is cached by the network caching device; and
if the second object is not cached by the network caching device, then in response to the request for the second object,
retrieving the second object from an origin server,
providing the second object to the requesting client in response to the second request,
determining whether the second object is related to the first object, wherein determining whether the second object is related to the first object comprises
determining whether a source of the request for the second object matches a source of the request for the first object; and
determining whether a predetermined length of time has elapsed from the request for the first object to the request for the second object, and
if the second object is determined to be related to the first object and a predetermined size condition is met, then
writing the second object to said single file in the secondary storage facility, and
writing metadata for the second object into the first metafile entry.

11. A method as recited in claim 10, further comprising:
receiving a request for one of the related objects from a client over the network; and
accessing said one of the related objects in the main memory to provide said one of the related objects to the client, without accessing the secondary storage facility in response to the request for said one of the related objects.

12. A method as recited in claim 10, further comprising:
if the first object is not cached by the network caching device, then in response to the first request,
retrieving the first object from an origin server,
providing the first object to the client,
writing the first object into a first file in the secondary storage facility,
creating the first metafile entry in the main memory, and
writing metadata for the first object into the first metafile entry.

13. A method as recited in claim 10, wherein the predetermined size condition comprises the condition that writing metadata for the second object into the first metafile entry will not cause the first metafile entry to exceed a predetermined size.

14. A method as recited in claim 10, wherein the predetermined size condition comprises the condition that writing object data for the second object into the first file will not cause the first file to exceed a predetermined size.

15. A method as recited in claim 10, further comprising:
if the source of the second request does not match the source of the first request,
if the predetermined length of time has elapsed from the first request to the second request,
if storing metadata for the second object in the first metafile entry would cause the first metafile entry to exceed the predetermined size, or
if writing the second object to the first file would cause the first file to exceed a predetermined size, then
writing the second object to a second file in the secondary storage facility,
creating a second metafile entry in the main memory, and
writing metadata for the second object into the second metafile entry.

16. A method as recited in claim 15, further comprising:
if the predetermined length of time has elapsed from the first request to the second request,
if storing metadata for the second object in the first metafile entry would cause the first metafile entry to exceed the predetermined size, or
if writing the second object to the first file would cause the first file to exceed a predetermined size, then
closing the first metafile entry stored in the main memory, and
writing the first metafile entry to the secondary storage facility.

17. A method of operating a network caching device which includes random access memory (RAM) and a mass storage facility, the method comprising:
receiving a request for a first object over a network;
determining whether the first object is cached by the network caching device; and
if the first object is cached by the network caching device, then in response to the first request,
identifying a first metafile entry as being associated with the first object, the first metafile entry containing metadata for a plurality of related objects, including the first object, stored in a single file in the mass storage facility,
using the metadata in the first metafile entry to locate and read the plurality of related objects, including the first object, from the mass storage facility into the RAM, and
providing the first object to the client;
receiving a request for a second object over the network;
determining whether the second object is cached by the network caching device; and
if the second object is not cached by the network caching device, then in response to the request for the second object,
retrieving the second object from an origin server,
providing the second object to the requesting client in response to the second request,
determining whether the second object is related to the first object, wherein determining whether the second object is related to the first object comprises
determining whether a source of the request for the second object matches a source of the request for the first object; and
determining whether a predetermined length of time has elapsed from the request for the first object to the request for the second object, and
if the second object is determined to be related to the first object and a predetermined size condition is met, then
writing the second object to the first file in the mass storage facility, and
writing metadata for the second object into the first metafile entry, wherein the predetermined size condition comprises the conditions that writing metadata for the second object into the first metafile entry will not cause the first metafile entry to exceed a first predetermined size, and writing the second object to the first file would cause the first file to exceed a second predetermined size.

18. A method as recited in claim 17, further comprising:

if the first object is not cached by the network caching device, then in response to the first request, retrieving the first object from an origin server, providing the first object to the client, writing the first object into a first file in the mass storage facility, creating the first metafile entry in the RAM, and writing metadata for the first object into the first metafile entry.

19. A method as recited in claim 17, further comprising:

if the source of the second request does not match the source of the first request, or the predetermined length of time has elapsed from the first request to the second request, or storing metadata for the second object in the first metafile entry would cause the first metafile entry to exceed the predetermined size, or writing the second object to the first file would cause the first file to exceed a second predetermined size, then writing the second object to a second file in the mass storage facility, creating a second metafile entry in the RAM, and writing metadata for the second object into the second metafile entry.

20. A method as recited in claim 19, further comprising:

if the predetermined length of time has elapsed from the first request to the second request, storing metadata for the second object in the first metafile entry would cause the first metafile entry to exceed the predetermined size, or writing the second object to the first file would cause the first file to exceed a second predetermined size then closing the first metafile entry stored in the RAM, and writing the first metafile entry to the mass storage facility.

21. A machine-readable program storage medium for use in a network-connected processing system which includes a primary storage and a secondary storage, the storage medium containing instructions which, when executed by the processing system, cause the processing system to perform a process comprising:

creating a set of metafile entries, each of the metafile entries containing metadata for a logical grouping of related objects stored by the processing system; and using the set of metafile entries to reduce accesses to the secondary storage in response to requests for the objects, including:

receiving a request for an object from a client over a network;

determining whether the object is cached by the network device; and if the object is not cached by the network device, then in response to the request for the object, determining whether the object is related to a previously requested object, wherein the object is determined to be related to the previously requested object if the object and the previously requested object are determined to have been requested by the same client within a specified period of time, and if the object is determined to be related to the previously requested object and a predetermined condition is met, then writing the object to a file in the secondary storage, and writing metadata for the object into a metafile entry which contains metadata for both the object and the previously requested object.

22. A machine-readable program storage medium as recited in claim 21, wherein the processing system is a network caching device which caches objects provided by origin servers in response to requests from clients on a network.

23. A machine-readable program storage medium as recited in claim 22, wherein the primary storage is a main memory of the network caching device and the secondary storage is a mass storage facility of the network caching device.

24. A machine-readable program storage medium as recited in claim 21, wherein said process further comprises providing a requested object to a requesting device over a network in response to receiving a request for the object.

25. A machine-readable program storage medium as recited in claim 21, wherein using the set of metafile entries to reduce accesses to the secondary storage comprises:

if the object is cached by the network device, then in response to the request for the object, identifying a metafile entry as being associated with the object, and using metadata in the metafile entry to locate and read each of a plurality of related objects from the secondary storage into the primary storage.

26. A machine-readable program storage medium as recited in claim 21, further comprising instructions which, when executed by the processing system, cause the processing system to perform:

receiving a request for one of the related objects from a client over the network; and accessing said one of the related objects in the primary storage to provide said one of the related objects to the client, without accessing the secondary storage in response to the request for said one of the related objects.

27. A machine-readable program storage medium as recited in claim 21, wherein the file also contains the previously requested object.

28. A machine-readable program storage medium as recited in claim 21, wherein the predetermined condition comprises a size limit imposed on the metafile entry.

29. A network caching device comprising:

a processor;

a network interface coupled to the processor to connect the network caching device to a network;

a main memory coupled to the processor;

a mass storage facility coupled to the processor; and a set of instructions executable by the processor to cause the network caching device to perform a process which includes receiving a request for a first object from a client over the network;

determining whether the first object is cached by the network caching device;

if the first object is cached by the network caching device, then in response to the first request, identifying a first metafile entry as being associated with the first object, the first metafile entry containing metadata for a plurality of related objects, including the first object, stored in the mass storage facility, using the metadata in the first metafile entry to locate and read the plurality of related objects, including the first object, from the mass storage facility into the main memory, and providing the first object to the client;

receiving a request for a second object from a client over the network;

determining whether the second object is cached by the network caching device; and if the second object is not cached by the network caching device, then in response to the request for the second object, retrieving the second object from an origin server, providing the second object to the requesting client in response to the second request, determining whether the second object is related to the first object, and if the second object is determined to be related to the first object and a predetermined size condition is met, then writing the second object to the first file in the mass storage facility, and writing metadata for the second object into the first metafile entry.

30. A network caching device as recited in claim 29, wherein the plurality of related objects are stored in a single file in the mass storage facility when the metadata in the first metafile entry is used to locate and read the plurality of related objects from the mass storage facility into the main memory.

31. A network caching device as recited in claim 29, wherein said process further comprises:

if the first object is not cached by the network caching device, then in response to the first request, retrieving the first object from an origin server via the network interface, providing the first object to the client, writing the first object into a first file in the mass storage facility, creating the first metafile entry in the main memory, and writing metadata for the first object into the first metafile entry.

32. A network caching device as recited in claim 29, wherein the predetermined size condition comprises the condition that writing metadata for the second object into the first metafile entry will not cause the first metafile entry to exceed a predetermined size.

33. A network caching device as recited in claim 32, wherein the predetermined size condition comprises the condition that writing object data for the second object into the first file will not cause the first file to exceed a predetermined size.

34. A network caching device as recited in claim 29, wherein said process further comprises:

if the source of the second request does not match the source of the first request, the predetermined length of time has elapsed from the first request to the second request, storing metadata for the second object in the first metafile entry would cause the first metafile entry to exceed the predetermined size, or writing object data for the second object into the first file will cause the first file to exceed a predetermined size, then writing the second object to a second file in the mass storage facility, creating a second metafile entry in the main memory, and writing metadata for the second object into the second metafile entry.

35. A network caching device as recited in claim 34, wherein said process further comprises:

if the predetermined length of time has elapsed from the first request to the second request or storing metadata for the second object in the first metafile entry would cause the first metafile entry to exceed the predetermined size, then closing the first metafile entry stored in the main memory, and writing the first metafile entry to the mass storage facility.

36. A network caching device as recited in claim 29, wherein said process further comprises:

receiving a request for one of the related objects from a client over the network; and accessing said one of the related objects in the main memory to provide said one of the related objects to the client, without accessing the mass storage facility in response to the request for said one of the related objects.

37. A network device comprising:

a primary storage;

a secondary storage;

means for creating a set of metafile entries, each of the metafile entries containing metadata for a logical grouping of related objects cached by the network device; and means for using the set of metafile entries to reduce accesses to the secondary storage in response to requests for the objects, by receiving a request for an object from a client over a network;

determining whether the object is cached by the network device; and if the object is not cached by the network device, then in response to the request for the object, determining whether the object is related to a previously requested object, wherein the object is determined to be related to the previously requested object if the object and the previously requested object are determined to have been requested by the same client within a specified period of time, and if the object is determined to be related to the previously requested object and a predetermined condition is met, then writing the object to a file in the secondary storage, and writing metadata for the object into a metafile entry which contains metadata for both the object and the previously requested object.

* * * * *